INVENTOR:
DONALD W. PERKINS,
BY C. W. Baker
HIS ATTORNEY.

INVENTOR:
DONALD W. PERKINS,

BY C. W. Baker
HIS ATTORNEY.

3,426,241
MAGNETIC DEFLECTION SYSTEM FOR CATHODE RAY TUBES

Donald W. Perkins, De Witt, N.Y., assignor to General Electric Company, a corporation of New York Filed Nov. 7, 1966, Ser. No. 592,660
U.S. Cl. 315—27 8 Claims
Int. Cl. H01j 29/70

ABSTRACT OF THE DISCLOSURE

There is disclosed a magnetic deflection driver circuit for cathode ray tubes which affords high beam deflection rates without correspondingly high voltage power supply. The circuit as shown comprises a pair of solid state inverting amplifiers which differentially control the current flow from a common source including an inductive energy storage element for supply of peak deflection rate power. For assuring adequate energy storage in this element common mode current feedback is employed to hold the total current nearly constant, and for linearizing the input-output relationship differential mode current feedback and base current compensation are employed as described.

This invention relates generally to driver systems for magnetic deflection yokes as used with cathode ray tubes, and more specifically to such systems wherein high beam deflection rates are afforded without correspondingly high voltage power supply.

Among the difficulties long recognized as complicating the design of magnetic deflection systems, particularly in applications requiring variable beam deflection rates, is that the supply voltage must be sufficiently high to drive the magnetic deflection yoke at the highest rate required and, with such high voltage supply, the power dissipation in the driver amplifiers during slow or static conditions then is undesirably high. Since total power dissipation increases in general proportionality to the power supply voltage, this necessity for high voltage power supply results in correspondingly high power dissipation and a relatively low efficiency which may be particularly objectionable in solid state equipment.

To minimize these probelms various arrangements have been proposed utilizing energy storage devices connected to discharge their stored energy through the deflection yoke when the high deflection rates are called for and to be recharged during periods of operation at lower deflection rates. One such arrangement is disclosed in Patent No. 3,092,753 to Steiger, for example, in which the energy storage device is constituted by a transformer.

The present invention is directed to magnetic deflection driver systems using inductive energy storage to supply peak deflection rate power, but requires only a single-winding inductor which is noncritical in construction and performance characteristics and affords relatively high efficiency of operation. It is accordingly a principal object of the invention to provide magnetic deflection driver systems using inductive energy storage in the primary power circuit to supply peak power needs for high deflection rates, to thus enable the average driver power dissipation to be commensurate with the substantially lower average deflection rate rather than proportioned to peak deflection rate. It is also an object of the invention to provide such magnetic deflection driver systems operative with relatively low power supply voltage yet still affording linear and highly accurate control of beam deflection rate and position.

It is a further object of the invention to provide a linear magnetic deflection amplifier in which high peak deflection rate power is supplied by energy storage in a choke coil or like single-winding inductor. A further object is to provide means for optimizing the linearity of the relationship between the deflection yoke current and the input signal, and to provide such linearity of relationship through use of both common mode and differential mode current feedback. Still another object of the invention is the provision of such deflection drivers incorporating all solid state circuit components, and including means for protection of these components against otherwise destructive current or voltage transients. It is also an object to provide deflection drivers capable of utilization with power supplies having relatively poor voltage regulation and high ripple content, wtihout degradation of the deflection signal or excessive modulation of the power supply.

In carrying out the invention in one presently preferred embodiment there is provided a magnetic deflection driver circuit including a pair of push-pull connected inverting amplifiers differentially controlling the drive current through the deflection yoke windings, which preferably take the form of a single center tapped winding having its center tap connected to the driver power supply through an inductive energy storage element. This element has a value of inductance relatively large as compared to that of the yoke windings. To assure that energy storage in this inductor is at desired level, the circuit includes a feedback resistance network providing common mode current feedback operative to maintain the total current through the two yoke windings nearly constant at sufficiently high level that the current-inductance product provides adequate energy storage. Differential mode current feedback may also be provided, to assure linearity between the deflection drive signal and the input signal. Each of the inverting amplifiers preferably comprises an output transistor with base signal input and with the differential mode feedback resistor in series with the collector-emitter circuit. Such arrangement may require base current compensation, and means for accomplishing this may be provided in any of several different forms. With this arrangement relatively high beam deflection rates become possible without correspondingly high voltage power supply, and requiring only a relatively small and noncritical inductor element to achieve this desired driver voltage reduction.

These and other objects, features and advantages of the invention will become more fully apparent from the following detailed description and the appended claims when read in conjunction with the accompanying drawings, wherein:

FIGURE 1 is a schematic circuit diagram of a magnetic deflection driver system in accordance with the invention;

FIGURES 2*a*–2*e* are a series of waveforms showing voltage and current relationships within the circuit of FIGURE 1;

Figure 1:
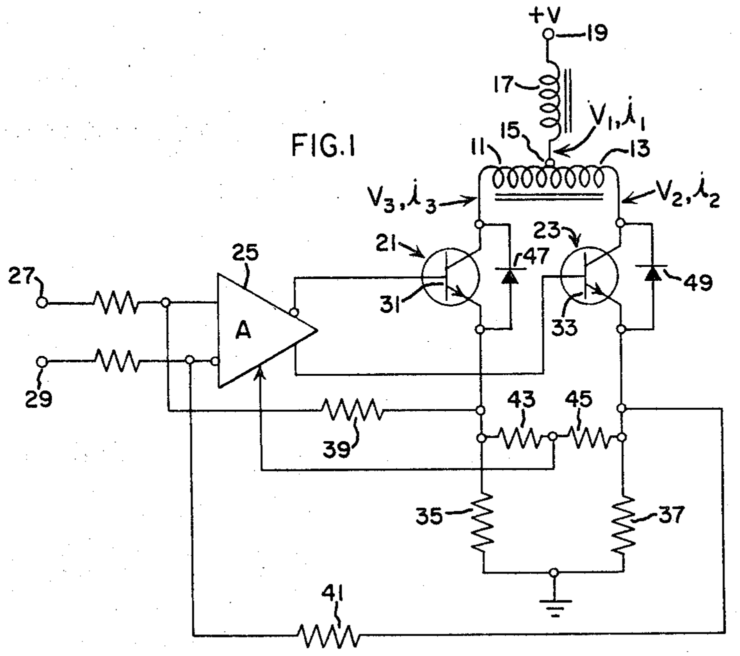

With continued reference to the drawings, wherein like reference numerals have been used throughout to designate like elements, FIGURE 1 illustrates the invention in one presently preferred embodiment. As shown, the magnetic deflection yoke for a cathode ray tube (not shown) includes a pair of oppositely pole windings 11 and 13 connected by a center-tap connection as at 15 to an inductive energy storage element 17 and, through it, to the high voltage supply terminal 19 to thus constitute the primary power circuit for the deflection yoke. Drive current through the deflection yoke windings 11 and 13 is controlled by a pair of inverting amplifiers 21 and 23 which are in turn driven by the differential outputs of amplifier 25 in response to control input signals to the amplifier differential input terminals 27 and 29.

Each of the amplifiers 21 and 23 comprises a high current transistor 31, 33, with each connected in grounded-emitter and base-input configuration. The emitter connections to ground are through two current sensing feedback resistors 35 and 37, across which a differential current feedback signal is taken and degeneratively fed back to the differential input of differential amplifier 25 through resistors 39 and 41, respectively, which control feedback signal level. The differential current feedback thus accomplished serves to linearize the operation of the entire drive amplifier and to assure proportionality between deflection drive current and input signal levels in generally conventional manner.

In addition to this differential mode current feedback, common mode current feedback also is provided by means of a pair of averaging resistors 43 and 45 between which a common connection 46 provides an average or mean value of total current and transmits this common mode or total current feedback signal to the differential amplifier 25 through a negative or degenerative feedback connection in a manner which will be more specifically described hereinafter. This common mode current feedback signal aids in the achievement of high deflection rates through its action in limiting the magnitude of variations in the sum of the deflection yoke winding currents, so that as current is cut back through one of the deflection yoke windings this tends to increase current flow through the other in order to maintain the total at nearly constant level. Common mode current feedback further serves the purpose of maintaining total current flow at a value each that inductive energy storage in the inductor 17 always is at sufficiently high level to provide a voltage boost adequate to produce the desired high deflection rate. To this same end, the inductor 17 is selected to provide a value of inductance which is many times that of the deflection yoke windings, a ratio of fifty-to-one being typical. With a yoke inductance of 120 microhenries, for example, six millihenries would be suitable for the inductor 17, and the inductor may take the form of a conventional iron core choke of this inductance value.

The system as thus for described operates with slow deflection rates as a simple Class A amplifier and deflection yoke. However, if the deflection rate is increased, one of the output transistors 31 or 33 will saturate and at this point the increase in current on that side of the circuit occurs less rapidly than the decrease in current on the other side, so there tends to occur a net reduction in total current flow. The inductance of the energy storage element 17, which as previously noted is very large compared to the yoke inductance, opposes such net change in total yoke current and, in an effort to maintain this value of current constant, raises the voltage at the yoke center tap. This voltage rise continues until the sum of the rate of voltage rise in the saturated side and the rate of fall on the opposite side equals the rate of change required by the input signal.

In the manner just described, inductive energy storage device 17 provides the necessary voltage increase to supply peak deflection rate needs, while keeping the average driver power dissipation commensurate with the average deflection rate. In performing this function it receives a substantial assist from the common mode current feedback circuit previously described. The way in which this operation is achieved may best be understood by reference to the voltage and current relationships illustrated in the waveforms of FIGURE 2, to which reference will now be made.

Figure 2A:
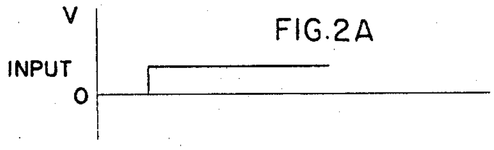
Figure 2B:
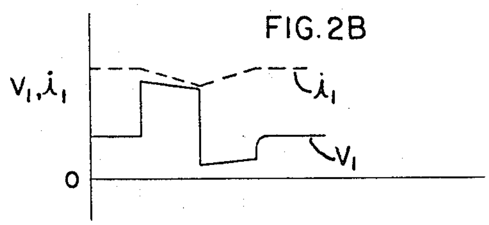
Figure 2C:
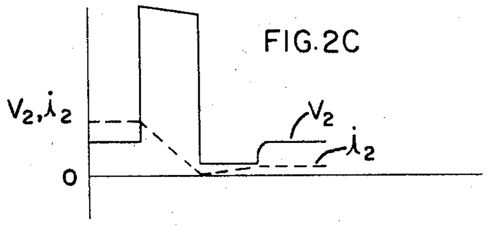

Responsive to a square wave input signal such as shown in FIGURE 2A, the differential amplifier 25 will drive one of the transistors 31–33 toward cutoff and the other toward saturation; for purposes of description the input signal will be assumed to be such that transistor 31 is the one driven to cutoff. As previously noted, current flow through the transistor thus switched off will decrease more rapidly than the rate of current increase in the transistor being driven toward saturation, so there tends to be a net decrease in total current flow through the circuit. This is shown in FIGURE 2B by curve $i_1$, which represents the current flow into the yoke center tap and thus constitutes total current. Current flow $i_2$ through the transistor 31 being driven towards cutoff drops rapidly toward zero as shown in FIGURE 2C, so voltage level at the collector of this transistor, namely voltage $v_2$, rises quite high as indicated by the $v_2$ curve in FIGURE 2C. An upper limit on this voltage rise is imposed by means to be described hereinafter, to prevent generation of voltage levels which might exceed those the transistors are capable of withstanding.

As illustrated in FIGURE 2B, the voltage $v_1$ at the yoke center tap 15 will rise sharply due to the effort of the circuit to maintain a constant current level notwithstanding the effectively higher impedance which results from cutoff of the transistor 31. This voltage rise will normally be to a value approximately half of that of the peak voltage $v_2$, the latter being at its higher value by reason of the self-inductance of yoke winding 11 and the change in current through that winding due to cutoff of the transistor 31.

Figure 2D:
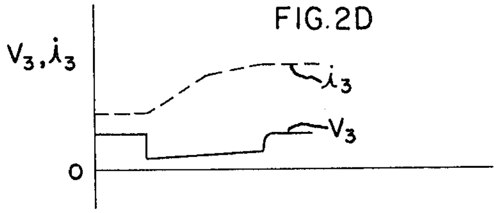
Figure 2E:
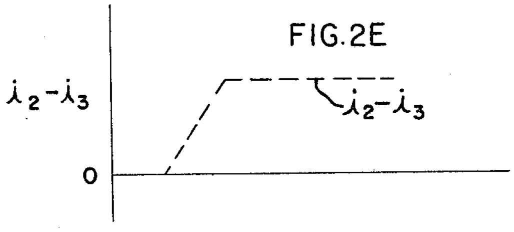

This high voltage $v_1$ at the yoke center tap 15 will tend to increase the rate of rise of current $i_3$ through the other transistor 33, thus increasing the rate of current flow through the yoke winding 13 and the speed of deflection of the cathode ray tube beam which of course is proportional to the difference between this current and the current $i_2$; that is, beam deflection rate is proportional to the yoke differential current $i_2–i_3$, shown in FIGURE 2E. Voltage at $v_3$ drops as shown in FIGURE 2D since the resistance of transistor 33 becomes quite low upon saturation of the transistor, then gradually increases slightly due to the increasing current flow through transistor 33 with consequent increase in voltage drop across this transistor and across the current sensing resistor 37 in series with it.

Referring again to FIGURES 2B and 2C, there is a rather abrupt transition in current and voltage relationships at some point in time after the step input, the moment at which this occurs coinciding with the point at which the yoke differential current flow ($i_2–i_3$) reaches the value commanded by the input signal. At this time the valtage $v_2$ drops to essentially the value of $v_3$, until the common mode current $i_1$ is restored to its quiescent value, at which point the voltages $v_2$ and $v_3$ rise back to their initial starting points. A corresponding sequence occurs in the case of voltage $v_1$, the curve of which in FIGURE 2B represents combined values of the corresponding curves in FIGURES 2C and 2D. The sharp rise in voltage $v_1$ at time of application of the step input pulse causes a very rapid increase in beam deflection rate which would otherwise require a power supply voltage substantially higher than made possible in this way.

As previously noted, it is desirable that there be an upper limit on the voltage differential across the switch-the transistors, connecting either collector-to-emitter as voltages during switching. One way of accomplishing this necessary ceiling is by use of avalanche diodes by passing the transistors, connected either collector-to-emitter as shown at 47 and 49 in FIGURE 1 or, if preferred, collector-to-base. Such bypassing may not be essential in all cases, however, and the diodes 47 and 49 often can be dispensed with by proper selection of transistor voltage ratings and operating parameters.

When this is done the upper limit on voltage then is established by the distributed capacitance, to ground, of the choke winding 17 and yoke windings 11 and 13, though capacitance of these latter windings normally is quite small as compared with that of the choke. Since current flow due to the distributed capacitance of the inductor windings is directly to ground, it bypasses the current sensing resistors 35 and 37 and thus might appear to detract from accuracy of positioning of the cathode ray tube beam. As a practical matter this is not significant, however, because such current flow is on the side of the circuit on which linearity with the input signal is not critical and because the bypass current is itself quite small.

Figure 3:
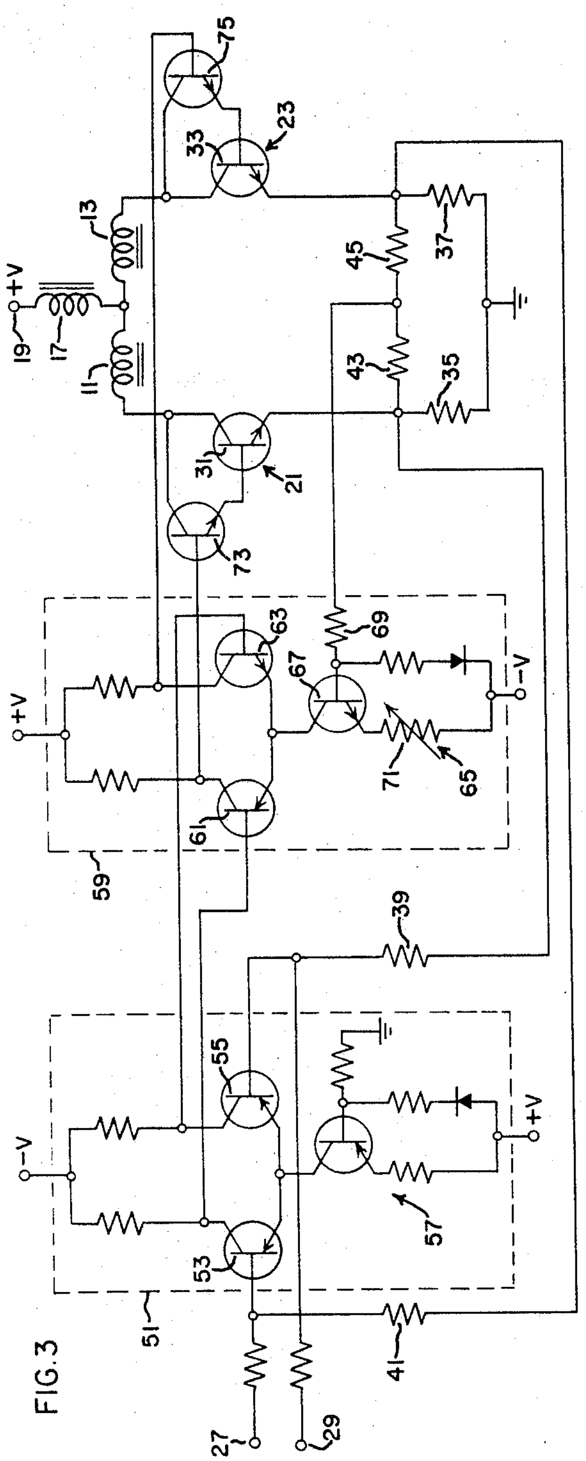
FIGURE 3 is a schematic circuit diagram of an alternative embodiment of the magnetic deflection driver system of this invention.

A circuit omitting the avalanche diodes is shown in FIGURE 3, which also illustrates in greater detail the differential amplifier circuitry and the feedback connections thereto. In FIGURE 3 the differential amplifier is shown as a two stage amplifier in which the first stage 51 is of conventional configuration and may conveniently take the form of one of the commercially packaged differential amplifier microcircuits. This stage comprises transistors 53 and 55 having a common emitter connection to a constant current source indicated generally at 57.

The second stage differential amplifier 59 is similar, comprising emitter coupled transistors 61 and 63 having common connection of their emitters to a bias current source 65. Unlike the current source 57 of the first stage differential amplifier 51, however, this source 65 is not a constant current source but rather modulates the level of its bias current output in accordance with the common mode feedback signal taken between feedback resistors 43 and 45 in the driver stage. This common mode current feedback signal adjusts the operating point of transistor 67 to effect a change in its collector current flow proportioned to the magnitude of the feedback signal and in a direction such that the effect on the operation of transistors 61 and 63 is degenerative, to thus maintain the common mode current level in the output stage at a nearly constant value determined by the value of current sensing resistors 35 and 37 and also by the values of resistors 69 and 71 in the current source circuit 65, the latter of these two resistors preferably being made adjustable as shown so as to enable adjustment of the feedback signal level. The open loop gain through this common mode circuit is by design made relatively lower than the differential mode open loop gain, so that at high deflection rates there may occur some fluctuation in common mode or total current flow such as shown in waveform $i_1$, in FIGURE 2B. This transient reduction in common mode current level below its normally constant value is necessary, as explained above with reference to FIGURE 2, to enable the inductive energy storage element 17 to accomplish the desired increase in level of the drive voltages $v_1$ and $v_2$ or $v_3$ required to achieve high deflection rates.

In FIGURE 3 the output stage including inverting amplifiers 21 and 23 is similar to FIGURE 1, but differs in that it includes means for reducing the effects of transistor base current variation on the desired linearity of the relationship between yoke drive current and the input signal. It will be noted that the current sensing resistors 35 and 37 carry not only the current which flows to them through the respective windings 11 and 13 of the deflection yoke, but also the input signal current flow to the control electrodes of the output transistors 31 and 33, i.e., the transistor base currents. Under some conditions of operation these transistor base currents may reach levels such that the error in yoke current measurement introduced by them is undesirably high. To reduce or avoid errors thus introduced, any of the various circuit arrangements illustrated in FIGURES 3, 4 and 5 and now to be described may be used.

In FIGURE 3, base current effects are minimized by the use of an additional drive transistor 73 for output transistor 31, and a similar drive transistor 75 for output transistor 33, with the drive and output transistor pairs cascaded in Darlington configuration as shown. With this arrangement the only current input to either of the transistor pairs which does not flow through the deflection yoke windings is the drive transistor base current, and due to the high current gain of the Darlington circuit the drive transistor base currents are negligibly small as compared to the output currents. Fluctuations in drive current levels accordingly do not significantly affect the accuracy of yoke current measurement.

Figure 5:
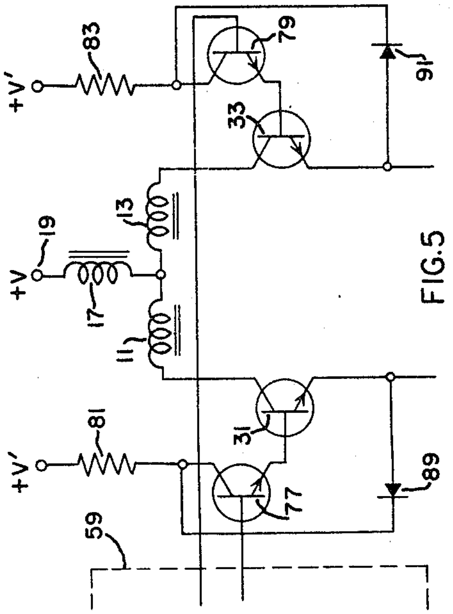
FIGURE 5 is a fragmentary circuit diagram showing another modified form of one sub-circuit of the circuit of FIGURE 3.
Figure 4:
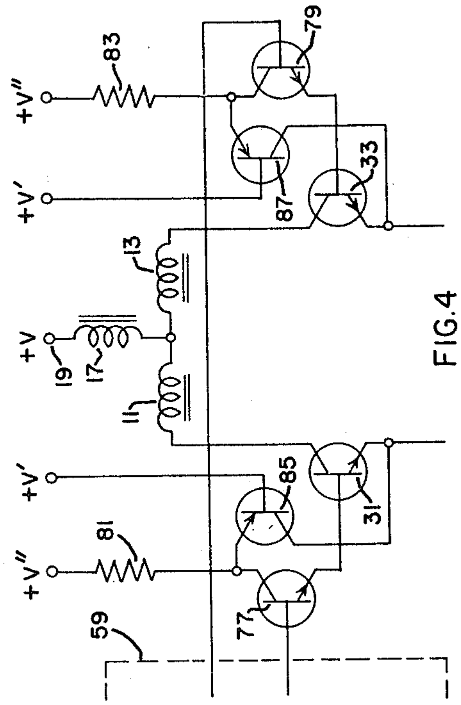
FIGURE 4 is a fragmentary circuit diagram showing a modification of one sub-circuit of the circuit of FIGURE 3.

FIGURES 4 and 5 show alternative arrangements in which instead of minimizing the effects of base current variation by downwardly scaling the magnitude of base current input, as is done in the circuit of FIGURE 3, base current compensation is instead accomplished by adding to the base current a complementary current of magnitude varying in a manner such that the base current and the complementing current add together to produce a total value which is constant. In other words, the complementing current varies negatively with the base current so that the two together combine to yield a constant current value which does not affect the feedback signal derived by the current sampling resistors 35 and 37.

With reference to FIGURE 4, which illustrates only the portion of the driver output stage which has been modified to introduce this different form of base current compensation, the output transistors 31 and 33 have base signal inputs from driver transistors 77 and 79, respectively, and these in turn have base signal inputs from the differential amplifier 59 as previously described in reference to FIGURE 3. The voltage drop across resistors 81 and 83 each connected in the collector circuit of the one of the driver transistors 77 and 79 is held substantially constant by a pair of compensating transistors 85 and 87 connected as shown to bypass the driver transistors with shunt currents varying in inverse proportion to the collector currents from the driver transistors. The combined collector current from compensating transistor 85 and emitter current from driver transistor 77, and the similarly combined current from transistors 87 and 79, then is in each case held at constant value. This eliminates any variation in current flow into the current sensing resistors which might otherwise result from variations in base currents of the output transistors 31 and 33, and the only remaining variation is that in base current of the driver and compensating transistors and this is negligibly small due to the very high gain of these transistors.

FIGURE 5 illustrates another arrangement differing in that it utilizes diodes 89 and 91 for deriving the compensation currents which bypass the driver transistors 77 and 79 and which when added to their emitter currents into the output transistor bases total to a substantially constant value. Diodes 89 and 91 are of the avalanche type, which operate at very nearly constant voltage when conducting in the reverse direction. The current through resistor 81, for example, may pass through diode 89 or through driver transistor 77 and output transistor 31, but both paths return to emitter of transistor 31 so all of the current through resistor 81 must flow into the current sense resistor 35 (FIGURE 3) connected to the emitter of transistor 31. Since the voltage drop across diode 89 is essentially constant irrespective of variations in current flow through it, the voltage drop across resistor 81 and the current flow through it also remain substantially constant irrespective of variations in the ratio of division of this current between diode 89 and the base of transistor 31. Being thus maintained at nearly constant value, the net contribution of the drive circuit to total current flow through the current sensing resistor 35 does not impair the accuracy of its measurement of yoke current transients.

There is a change in current through resistor 81 as a function of the collector current of transistor 31, but this is a linear term and appears only as a small change in the gain and not as a factor in linearity. The dynamic impedance of diode 89 and the base current of transistor 77 contribute slightly to the total output current, but these terms are generally negligible compared to the current flowing through yoke winding 11 and transistor 31 into current sense resistor 35. The base current of transistor 33 is compensated in like manner, by means of diode 91, transistor 79 and resistor 83.

It will be noted that in this circuit, as well as in that of FIGURE 4, the driver transistors 77–79 and also the compensating transistors 85–87 in FIGURE 4 are isolated from the high voltage supply for the output transistors and accordingly do not require high voltage ratings. These units may therefore be selected from the high gain signal amplifier types having very small base currents, thus further reducing any error introduced thereby.

In operation of the driver circuits of this invention the base current compensation arrangements just described serve either to minimize the effective base current input, as in the circuit of FIGURE 3, or to cancel such variation as in the circuits in FIGURES 4 and 5. With either arrangement the desired linearity of response, and the desired linearity of relationship between the output and input signals may successfully be maintained. At the same time, the deflection drive systems of the invention provide relatively high efficiency of operation because the supply voltage at terminal 19 may be substantially lower than would otherwise be necessary, and they achieve this substantial reduction in required voltage level without corresponding circuit complication or performance penalty.

While in this description of the invention only certain presently preferred embodiments have been illustrated and described by way of example, many modifications such as substitution of vacuum tubes or other amplifying devices for the transistors shown will occur to those skilled in the art and it therefore should be understood that the appended claims are intended to cover all such modifications as fall within the true spirit and scope of the invention.

What is claimed as new and desired to be secured by Letters Patent of the United States is:

1. A magnetic deflection driver circuit comprising:

a deflection yoke including oppositely poled windings having a common center connection;

primary power circuit means including a high voltage supply;

an inductor having a value of inductance relatively large as compared to the inductance of said yoke and connecting said high voltage supply to said yoke winding common connection, the capacitance to ground at said common connection being the distributed capacitance to ground of the winding of said yoke and said inductor;

a pair of inverting amplifiers each connected in series relation with one of said yoke windings and operative to differentially control current flow therethrough in accordance with a control signal input to said amplifiers;

current sensing means responsive to said yoke winding currents to derive a feedback signal providing measure of common mode current level;

and feedback circuit means degeneratively coupling said feedback signal to said amplifiers so as to limit the magnitude of variations in common mode current levels at high deflection rates.

2. A magnetic deflection driver circuit comprising:

a deflection yoke including oppositely poled windings having a common center connection;

power supply means;

an inductive energy storage element connecting said power supply means to said yoke winding common connection, said inductive energy storage element having a value of inductance relatively large as compared to the inductance of said yoke windings;

deflection current control means connected in series relation with said yoke windings and including a pair of inverting amplifiers operative to differentially control the current levels in said yoke windings;

current sensing means responsive to said yoke winding currents toderive a feedback signal providing a measure of common mode current level;

and feedback circuit means degeneratively coupling said feedback signal to said amplifiers so as to hold said common mode current nearly constant.

3. A deflection driver circuit as defined in claim 2 further including yoke current differential mode current sensing means operative to derive two feedback signals each providing a measure of current level in one of said yoke windings;

and means degeneratively coupling the differential mode current feedback signal for each said yoke winding to the associated amplifier to thus linearize operation of the deflection driver circuit.

4. A deflection driver as defined in claim 2 wherein said deflection current control means further comprises:

a differential amplifier including a pair of emitter coupled transistors connected to provide diffierential output signals to said inverting amplifiers in response to differential signal input with the amplifier signal level varying with level of bias current supply to said transistors;

and controlled current supply means connected to supply to said transistors bias currents modulated in accordance with said common mode current feedback signal.

5. A deflection driver circuit as defined in claim 2 wherein each of said amplifiers includes a control electrode the signal current input to which adds to the yoke winding currents before measurement thereof by said current sensing means, and further includes means for compensating any error in yoke current measurement otherwise introduced by this control electrode current.

6. A deflection driver circuit as defined in claim 5 wherein said amplifiers each comprise an output stage and a driver stage connected in cascade relation with both stages receiving their high level current input from the associated yoke winding whereby the current output of said driver stage to the control electrode of the output stage does not detract from accuracy of measurement of yoke current because derived therefrom.

7. A deflection driver circuit as defined in claim 5 wherein said compensation is afforded by current supply means connected to add to said yoke current and said control electrode current a compensating current of magnitude so related to said control electrode current that their sum is nearly constant and accordingly does not compromise accuracy of measurement of yoke current by said current sensing means.

8. A deflection driver circuit as defined in claim 7 wherein said amplifiers each comprise an output stage and a driver stage in series relation, and said current supply means comprises voltage responsive means connected across both said stages and operative to modulate said compensating current as necessary to hold the voltage drop across said stages substantially constant.

References Cited

UNITED STATES PATENTS

| | | | |
|---|---|---|---|
| 3,155,873 | 11/1964 | Paschal | 315—27 |
| 3,092,753 | 6/1963 | Steiger | 315—27 |

RODNEY D. BENNETT, *Primary Examiner.*

C. L. WHITHAM, *Assistant Examiner.*